L. B. RICHARD.
FRUIT CORING AND CUTTING DEVICE.
APPLICATION FILED MAR. 30, 1911.
1,042,823.
Patented Oct. 29, 1912.
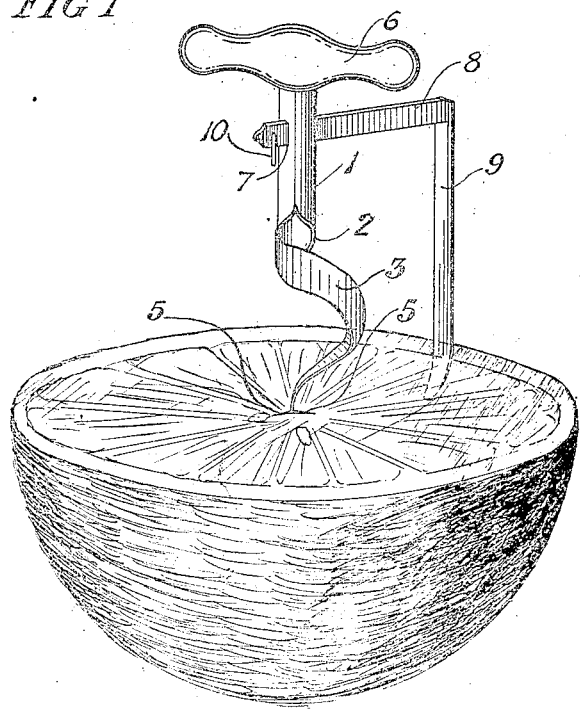
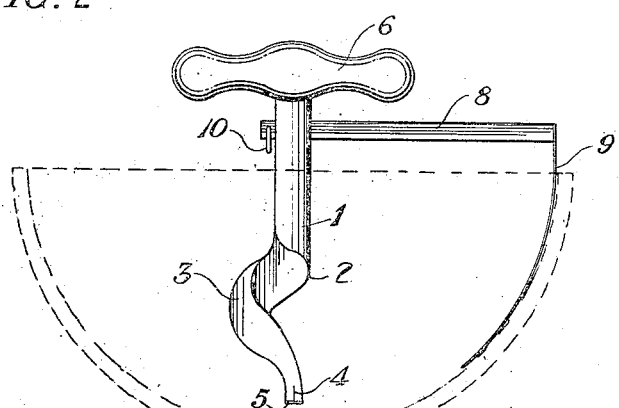
WITNESSES:
INVENTOR.
L. B. Richard
BY
ATTORNEYS

UNITED STATES PATENT OFFICE.

LEVI B. RICHARD, OF PITTSBURGH, PENNSYLVANIA.

FRUIT CORING AND CUTTING DEVICE.

1,042,823.  Specification of Letters Patent. Patented Oct. 29, 1912.

Application filed March 30, 1911. Serial No. 617,857.

*To all whom it may concern:*

Be it known that I, LEVI B. RICHARD, a citizen of the United States of America, residing at Pittsburgh, in the county of Allegheny and State of Pennsylvania, have invented certain new and useful Improvements in Fruit Coring and Cutting Devices, of which the following is a specification, reference being had therein to the accompanying drawing.

This invention relates to a fruit coring and cutting device particularly designed for cutting and coring grape fruit, oranges, apples and other fruit.

The primary object of the invention is to provide a simple and durable device for expeditiously removing the core of fruit and for simultaneously cutting the fruit whereby the palatable part can be removed from the rind or skin.

Another object of this invention is to provide a device that can be advantageously used for providing the half of a grape fruit with a well or cavity in which a wine, cordial or other liquid can be placed to lend to its nourishment.

A further object of the invention is to provide a device of the above type that is inexpensive to manufacture, neat in appearance and highly efficient for the purposes for which it is intended.

With the above and other objects in view the invention resides in a novel construction, combination and arrangement of parts to be hereinafter specifically described and then claimed.

Reference will now be had to the drawing wherein there is illustrated a preferred embodiment of the invention, but it is to be understood that the structural elements are susceptible to variation without departing from the scope of the appended claims.

In the drawing:—Figure 1 is a perspective view of the device, and Fig. 2 is a side elevation of the same.

A device in accordance with this invention comprises a tubular shank 1 preferably made of a sheet of metal bent to a cylindrical or tubular form, the piece of metal having the lower end thereof reduced, as at 2, whereby it can be twisted or spirally wound to provide a corkscrew, spiral or sinuous cutting blade 3. The blade 3 gradually tapers and has the lower end thereof split, as at 4, to provide arms 5 that are bent in opposite directions to constitute lateral blades.

Mounted upon the upper end of the shank 1 is a suitable handle 6, and said shank has diametrically opposed walls thereof provided with openings 7, for an arm 8, slidably retained within said openings by the walls of said openings functionally engaging the sides of the arm 8. The outer end of the arm 8 is provided with a flexible cutting blade 9, which is preferably formed integral with said arm. The inner end of the arm 8 has a pin or handle 10 adapted to prevent accidental displacement of said arm relatively to the shank 1, said pin or handle also facilitating the adjustment of the arm in said shank.

The flexibility of the blade 9 is such that said blade can enter a grape fruit and cut the fruit very closely to the inner side of a rind, without cutting through the rind or the pulp thereof.

The device is inserted into the fruit by pressure applied on the handle, the particular form of the spiral cutting blade and of the outer cutting blade permitting this operation to be provided; in this manner the lateral blades 5 will readily pass to their lower position without affecting the core excepting to pierce it in the direction of its length. When in this position, the handle is turned a complete revolution, which has the effect of cutting the core at the sides, as well as at the bottom, and at the same time the rind and pulp are separated, the pressure of the outer cutting knife being resisted by the presence of the core in the fruit. When the cutting has been completed, it is only necessary to raise the device which removes the core, and owing to the particular form of the spiral cutting blade, there is provided the well-like cavity in the fruit.

When the device and the core are removed a well or cavity is formed centrally in the fruit, and in this well or cavity a liquid or solid matter, as sugar or decorations can be placed, not only to improve the taste of the grape fruit but to add to its looks for table decorating purposes.

The device in its entirety can be made of light and durable steel or other metal, and in some instances the handle 6 can be made of wood and suitably ornamented.

What I claim is:—

1. A device of the type described comprising a tubular shank having the lower end thereof reduced and spirally wound to provide a spiral cutting blade, a handle carried by the upper end of said shank, an arm slidably mounted in said shank, and a flexible cutting blade carried by said arm, said spiral cutting blade being formed to permit the device to be inserted into the fruit without turning the handle and thereby positioning the cutting elements to provide simultaneous cutting by both elements when the handle is rotated.

2. A device of the type described comprising a shank, a spiral cutting blade carried thereby, a handle carried by said shank, and an arm slidably mounted in said shank, and a flexible cutting blade carried by the outer end of said arm, said spiral cutting blade being formed to permit the device to be inserted into the fruit without turning the handle and thereby positioning the cutting elements to provide simultaneous cutting by both elements when the handle is rotated.

3. A device of the type described comprising a shank made of a single piece of metal, said shank having the lower end thereof reduced and spirally wound to provide a spiral cutting blade, lateral oppositely disposed cutting blades carried by the lower end of said spiral cutting blade, an arm adjustably held by said shank, and a flexible cutting blade carried by the outer end of the said arm, said spiral cutting blade being formed to permit the device to be inserted into the fruit without turning the handle and thereby positioning the cutting elements to provide simultaneous cutting by both elements when the handle is rotated.

In testimony whereof I affix my signature in the presence of two witnesses.

LEVI B. RICHARD.

Witnesses:
 CHRISTINA T. HOOD,
 MAX H. SROLOVITZ.